United States Patent [19]

Larner

[11] Patent Number: 4,745,585
[45] Date of Patent: May 17, 1988

[54] METHOD OF MIGRATING SEISMIC DATA

[75] Inventor: Kenneth L. Larner, Houston, Tex.

[73] Assignee: Western Atlas International, Inc., Houston, Tex.

[21] Appl. No.: 847,950

[22] Filed: Apr. 3, 1986

[51] Int. Cl.$^4$ .............................................. G01V 1/36
[52] U.S. Cl. ........................................ 367/50; 367/63
[58] Field of Search ............................ 367/50, 59, 63; 364/421

[56] References Cited

U.S. PATENT DOCUMENTS

| | | | |
|---|---|---|---|
| 3,611,278 | 10/1971 | Guinzy | 367/63 |
| 4,259,733 | 3/1981 | Taner et al. | 367/61 |
| 4,298,968 | 11/1981 | Ruehle et al. | 367/59 |
| 4,330,873 | 5/1982 | Peterson | 367/60 |
| 4,355,379 | 10/1982 | Sherwood | 364/421 X |
| 4,464,737 | 8/1984 | Pann | 367/49 |
| 4,479,205 | 10/1984 | Gray | 367/63 |
| 4,503,527 | 3/1985 | Pann | 367/53 |
| 4,611,312 | 9/1986 | Ikeda | 364/421 X |

FOREIGN PATENT DOCUMENTS 8601918  3/1986  PCT Int'l Appl. .

OTHER PUBLICATIONS

Larner, L. and L. Halton (1976); Wave-Equation Migration: Two approaches, Eigth Annual Offshore Technology Conference, Houston, TX.
Yilmaz, O. and Claerbout, J., Prestack Partial Migration, Geophysics, vol. 45, No. 12, Oct. 1980, pp. 1753-1779.
Mufti, I. R. (1985), Seismic Migration: Basic Concepts & Popular Methods, Part 1; Geophysics: The Leading Edge of Exploration, Aug., pp. 24-28.
Mufti, I. R. (1985), Seismic Migration: Basic Concepts & Popular Methods, Part II, Geophysics; The Leading Edge of Exploration, Sep., pp. 54-58.
Larner, K. and C. Beasley (1985), Cascaded Migrations: A way of Improving the Accuracy of Finite-Difference Time Migration, SEG Washington D.C.
Rothman, D. H. et al., (1985), Residual Migration: Applications and Limitations, Geophysics, Vol. 50, No. 1, pp. 110-126.

Primary Examiner—Thomas H. Tarcza
Assistant Examiner—Tod Swann
Attorney, Agent, or Firm—Barry C. Kane

[57] ABSTRACT

Seismic data are passed through a preselected number of migration stages. During each stage, data are migrated a plurality of times, where the migration-velocity function is a minor fraction of the velocity required to fully migrate the data in a single stage. The cascaded migration migrates data having steeply-dipping events with greater accuracy and with less noise or artifacts than does a single-stage migration.

5 Claims, 2 Drawing Sheets

WHERE $V_1 < V_2 < V$

METHOD OF MIGRATING SEISMIC DATA

BACKGROUND OF THE INVENTION

1. Field of the Invention

This invention relates to seismic-data processing and particularly to a method of improving the resolution of migration in sections having steeply-dipping reflector horizons.

2. Discussion of the Related Art

In reflection seismic profiling, seismic signals are generated at or near the surface of the earth. Normally these seismic signals are considered to be in the form of a compressional wave field. As the signals propagate downward into the earth they are reflected and diffracted by discontinuities in the earth. Some of the signals are returned upward to the surface of the earth where they are detected by suitable seismic sensors. The returned signals are usually in the form of a train of seismic waves that are received over a predetermined period of time such as 10 seconds (s).

Along the earth's surface above an area of interest, many sensors are deployed along a line or grid. Each sensor is usually in the form of an electromechanical transducer which converts the detected seismic signals into corresponding electrical signals. The electrical signals generated by each sensor correspond in amplitude and phase as a function of frequency to that of the received seismic wave train. The electrical signals from each sensor are transmitted over conductors to a remote recording unit for later processing.

The detected seismic signals do not provide a true cross-section of the earth's subsurface. They represent only the two-way travel time of the signals generated at the earth's surface to a reflector and back to the surface. The reflected signals reaching the surface propagate in the form of ever-expanding wave fronts. In a nonuniform medium, variations in velocity of propagation tend to influence and modify the direction of propagation and are accompanied by mutual interference of wave fronts. In zones of sudden changes along geologic interfaces such as faults, a portion of the seismic signal undergoes diffraction. Consequently the record of detected signals represents a distorted image of the earth's subsurface; an image which has undergone a complicated process of focusing, defocusing, interference and diffraction. A numerical process for correcting these propagation effects in the data is the process of migration.

Migration is the process used to transform received seismic data into a visual display more closely representative of the subsurface. One migration technique that has been widely used is founded on the finite-difference formulation of the scalar-wave equation. The finite-difference approach relies on the separation of upgoing and downgoing signals by approximations to a differential equation. This approach requires a correct propagation velocity, V, to fully migrate the seismic data. This approach, although sufficiently accurate for reflectors having dips less than about 25 degrees, does not work well with seismic data where reflectors have dips greater than about 25 degrees.

The migration error, a combination of incorrect positioning of reflectors and frequency-dependent dispersion, is a complicated function of many parameters: the temporal and spatial sampling intervals associated with the discretely-sampled data, the depth increment used in the finite-difference approximation to the derivative with respect to depth, the medium velocity, seismic-signal frequency, and reflector dip. A major source of migration error is an error in the estimate of the migration velocity. The effects of an incorrect choice of migration velocity increase somewhat exponentially with the reflector dip and the magnitude of the velocity used in the migration calculation. In general, with proper choices of parameters, the position error (usually expressed in terms of relative error in lateral position or time), is generally less than 1% for dips less than 20 degrees and more than 5% for dips greater than 25 degrees. For dips greater than 35 degrees, the error exceeds 10% and the method becomes useless. While other migration approaches (e.g., frequency-wavenumber and Kirchhoff-summation migration) are more accurate under restricted conditions, the finite-difference method is the most efficient of the methods capable of migrating data from media on which the velocity varies vertically and horizontally.

SUMMARY OF THE INVENTION

It is one object of this invention to provide an improved computer-aided method of seismic data migration that is accurate for reflectors of up to as much as 80° of dip and to provide this accuracy with substantially the same number of computational steps as that involved in a single migration using conventional finite-difference techniques. In this method, the data are subjected to a series of cascaded migration passes, using for each pass or stage, a minor fraction of the migration velocity that would normally be used for single-pass migration.

This inventive computer-aided method for migrating seismic data involves generating a depth-variable velocity function, having a limited maximum velocity, from data samples of the seismic data. A minor velocity fraction is calculated by dividing the maximum velocity by the square-root of a preselected number of cascaded stages to be used in the migration method. The seismic data samples are partially migrated during each one of a succession of n migration stages, each stage has a depth-variable velocity, and a constant migration velocity substantially equal to the minor velocity fraction, applied thereto as a function of migration stages until the data samples are fully migrated.

BRIEF DESCRIPTION OF THE DRAWINGS

A better understanding of the benefits and advantages of my invention may be obtained from the appended detailed description and the drawings, wherein.

DETAILED DESCRIPTION OF THE INVENTION

The details involved in the finite-difference migration technique will not be recounted herein. For information regarding this method, the reader is directed to "Fundamentals of Geophysical Data Processing" by Jon F. Claerbout, McGraw-Hill, 1976.

The inventive method will be described in relation to the finite-difference approach of seismic migration. However it is to be understood that it may be applied equally as well to other migration methods.

Figure 1:
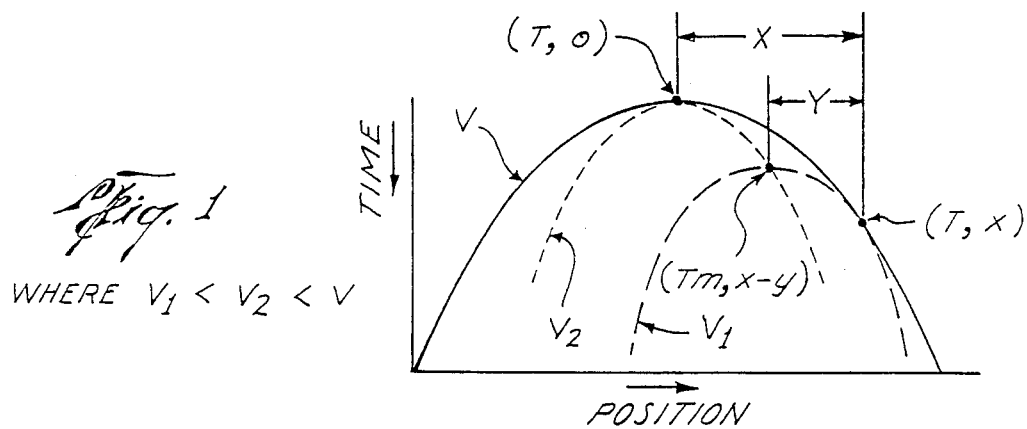
FIG. 1 is a diagram showing hyperbolic diffraction patterns for unmigrated, undermigrated, and fully migrated data.

Seismic data will be undermigrated when the migration velocity function used is less than the velocity function necessary to fully migrate the data. Specifically, in a homogeneous medium, dipping reflections will fail to move completely to their fully migrated positions, and diffraction patterns will only partially collapse. Diffraction hyperbolas such as shown in FIG. 1, characteristic of zero-offset data from a homogeneous medium, for example, collapse partially to smaller hyperbolas and not to their source of scattering. FIG. 1 shows a hyperbolic diffraction pattern containing a representative unmigrated point (T,X) and a correctly migrated point ($T_o$,O). If the data are undermigrated, the point (T,X) moves to point ($T_m$,x−y). Because the residual energy is aligned along hyperbolas, the migration task can be completed by doing a subsequent migration. For example, assume the migration velocity is V for full migration, but a fraction of that velocity, $V_1$, was used in the first migration, it can be shown that the velocity $V_2$ to be used in a subsequent migration may be determined by Equation (1) where, $$V_2 = (V^2 - V_1^2)^{\frac{1}{2}}. \tag{1}$$

Equation (1) can be expanded to show that the result of a number (n) of cascaded stages of migration done with velocities $V_1, V_2, \ldots, V_n$, is equivalent to a single migration with the effective migration velocity, $$V = \left( \sum_{j=1}^{n} V_j^2 \right)^{\frac{1}{2}}. \tag{2}$$

If all the velocities $V_j$ are equal, then Equation (2) reduces to $$V^2 = nV_j^2, \tag{3}$$

For suitably large choice of n (greater than or equal to 3), $V_j$ will be a minor fraction of V.

Figure 2:
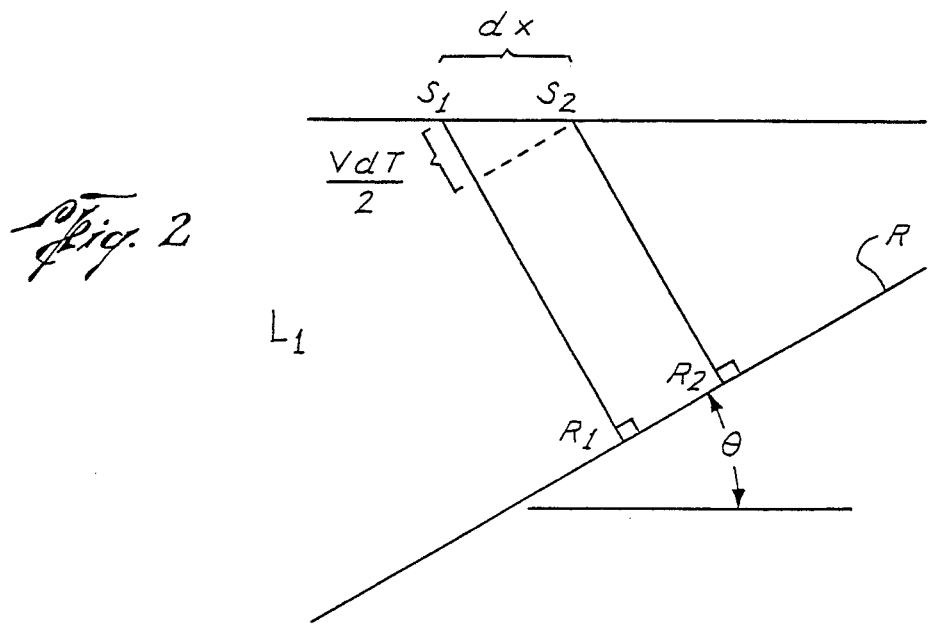
FIG. 2 is a diagram of normal-incidence raypaths to a dipping reflector beneath a homogeneous layer.
Figure 3:
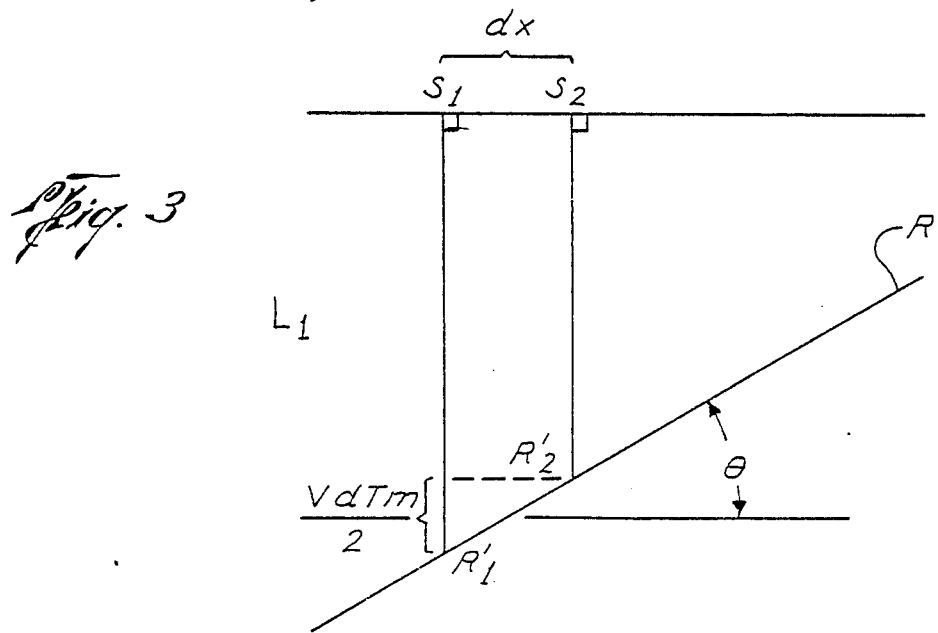
FIG. 3 is a diagram of raypaths to a dipping reflector beneath a homogeneous layer.

Equations (1)–(3) suggest a means of increasing the accuracy of finite-difference migrations. Refer to FIGS. 2 and 3. FIG. 2 shows parallel, normal-incidence raypaths $S_1R_1$ and $S_2R_2$ through a constant-velocity layer $L_1$ to a reflector R having a dip $\theta$. From the geometry in FIG. 1, it follows that $$VdT/2 = dX \sin \theta, \tag{4}$$

where dX is the distance between the two neighboring surface points $S_1$ and $S_2$, $\theta$ is the dip of the reflector R, and dT is the difference in normal-incidence two-way travel times at points $S_1$ and $S_2$. Suppose dX is the trace spacing in the seismic data, normally given by g/2, where g is the receiver group interval. If we let the time-dip $\rho = dT/dX$, Equation (4) becomes, $$\sin \theta = \rho V/2. \tag{5}$$

Equation (5) shows that the true spatial-dip can be determined from the measured time-dip, $\rho$, and the medium velocity, V. Assume that in Equation (5), an erroneous velocity, $V_1$, is used that is less than V, i.e., it is a minor fraction thereof. The result is that the estimate of the spatial dip is too small. This observation is the key to improving the accuracy of finite-difference migration.

Just as Equation (5) was developed relating spatial dip to time-dip in unmigrated data, the relationship between spatial and time-dip can be determined for migrated data. For migrated data, the pertinent raypaths are the vertical image raypaths $S_1R_1'$ and $S_2R_2'$ shown in FIG. 3. From FIG. 3, $$VdT_m/2 = dX \tan \theta. \tag{6}$$

In Equation (6), $T_m$ is the migrated two-way time, V is the velocity of the medium, $\theta$ is the angle of the reflector R, and dX again is the distance between neighboring surface points $S_1$ and $S_2$. When $\sigma$ is used for the correct time-dip, $dT_m/dX$ Equation (7) is derived.

$$\tan \theta = \sigma \sec \theta, \tag{7}$$

The ratio of Equation (5) and (7) yields $$\sigma = \rho \sec \theta, \tag{8}$$

relating the time-dips on unmigrated and migrated data.

In the initial stage of cascaded migration, the original seismic data are migrated using a velocity, $V_1$, where it is preferred that $V_1$ be a minor fraction of V, the velocity that would be used for migration done in a single pass. Using the lesser velocity $V_1$, the apparent spatial dip (of a given reflection) "perceived" by the first migration becomes $$\sin \theta_1 = V_1 \rho_1 / 2, \tag{9}$$

and the time-dip, $\sigma_1$, of the reflection after the first migration satisfies $$\tan \theta_1 = V_1 \sigma_1 / 2. \tag{10}$$

Dividing Equation (9) into (10) yields $$\sigma_1 = \rho_1 \sec \theta_1, \tag{11}$$

which is similar to that derived in Equation (8) supra.

The second stage of this method is to migrate the output from the first migration using a velocity $V_2$ such that $$V_1^2 + V_2^2 \leq V^2. \tag{12}$$

For the second migration stage, the migrated data from the first migration stage are considered as unmigrated data and are used as input. The time-dip of the reflection, $\rho_2$, is therefore equal to $\sigma_1$.

For the second and subsequent stages in a cascade of n migrations, from Equation (3), the velocities $V_j$ used in successive steps satisfy Equation (13), provided all $V_j$ are equal. That is, $$V^2 = \sum_{j=1}^{n} V_j^2, \tag{13}$$

Also, $$\rho_j = \sigma_{j-1} \tag{14}$$

$$\sin \theta_j = V_j \rho_j / 2 \quad (15)$$

$$\tan \theta_j = V_j \sigma_j / 2 \quad (16)$$

and $$\sigma_j = \rho_j \sec \theta_j, \quad \text{where } j = 1, 2, \ldots, n, \quad (17)$$

Here $\theta_j$ is the apparent spatial dip perceived by the jth migration stage, $\sigma_j$ is the time-dip of the reflection prior to the jth migration stage, and $\sigma_j$ is the time-dip afterwards.

Suppose the velocities, $V_j$, used in the successive migration steps are such that the final time-dip, $\theta_n$, is the correct result, $\sigma$, of Equation (8). That is, if $$\rho = \rho_n, \quad (18)$$

then the result of n cascaded migration stages will be the same as that of a single migration using the correct velocity, V. After recursive application of Equations (14) and (17), by induction, I find that $$\cos \theta = \prod_{j=1}^{n} \cos \theta_j, \quad (19)$$

where $\pi$ represents the product of the cos $\theta_j$, from which I conclude that $\theta_k$ is less than $\theta$, for all k. This follows from a rewriting of equation (19).

$$\cos \theta = \cos \theta_k \prod_{j \neq k}^{n} \cos \theta_j < \cos \theta_k \quad (20)$$

When all $V_j$ are equal, (not a requirement for this method) they satisfy Equation (3), and $$\sin \theta = \sqrt{n} \sin \theta_1, \quad (21)$$

$$\sin \theta_j = \tan \theta_{j-1}, \quad j = 2, 3, \ldots n, \quad (22)$$

and $$\tan \theta = \sqrt{n} \tan \theta. \quad (23)$$

Equation (23) shows that if n is large, $\theta_n$, the largest of the dips $\theta_j$, is significantly smaller than the true dip, $\theta$. Even for $n=4$, if $\theta=45°$ then $\theta_4=27°$. Thus, for this simple case, the perceived dip, $\theta_j$, may be small enough for accurate finite-difference migration, whereas $\theta$ is not.

It has been assumed above that the migration velocity V is constant for all depths, $\tau$ (tau). If, however, the migration velocity is depth-dependent, serious overmigration may occur at depths over which the gradient of the velocity, $V(\tau)$, is large. To circumvent the potential problem of overmigration, the depth-variable velocity function, $V_j(\tau)$, for the jth migration stage must have a specific behavior. That is, the migration velocity $V_j$ is kept constant for all depths except those depths for which overmigration would occur for a given migration stage if the velocity were not reduced. The velocities $V_j$ are chosen in accordance with Equation (3) where n is a chosen coefficient equal to the contemplated number of migration stages. The velocities $V_j$ are constants for each of a plurality of migration stages below a given $\tau_j$ boundary. Thus, $$V_j(\tau) = \begin{cases} 0 & \text{for } \tau < \tau_{j-1} \\ \text{minimum of} \begin{cases} [V^2(\tau) - ((j-1)/n) V_{max}^2]^{\frac{1}{2}} & \text{for } \tau \geq \tau_{j-1} \\ V_{max}/\sqrt{n} \end{cases} \end{cases} \quad (24)$$

where $V_{max}$ is the largest value of $V(\tau)$, typically the migration velocity at the deepest time of interest. $\tau_{j-1}$ is the depth above which the data have been fully migrated by the depth variable velocity function after $j-1$ migration stages in the cascaded sequence. Preferably, for practical reasons, n may be limited to about twenty.

Figure 4:
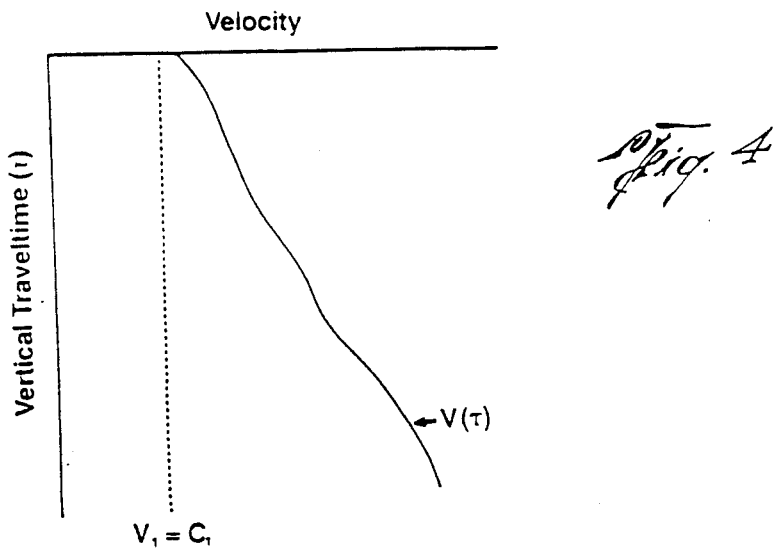
FIGS. 4–6 are graphical representations of a medium-velocity function with respect to depth or "tau" boundaries.
Figure 5:
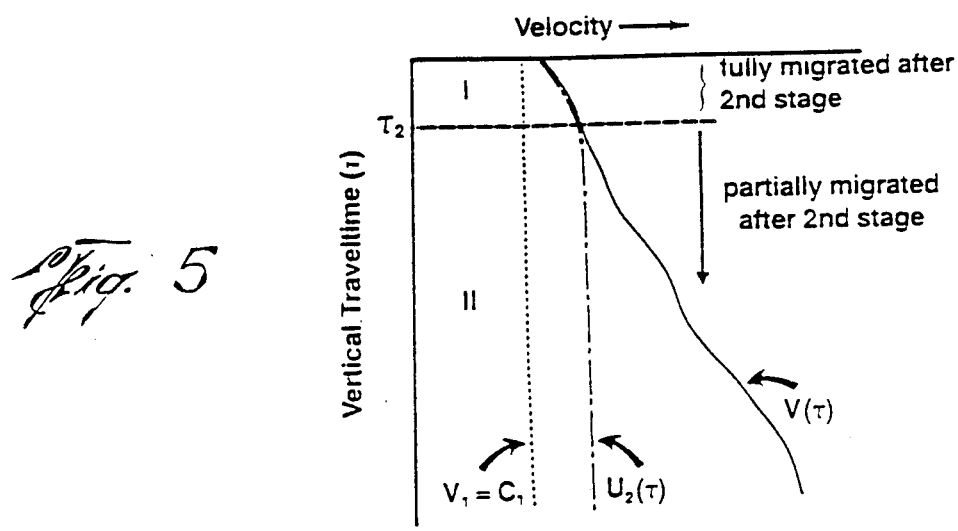
Figure 6:
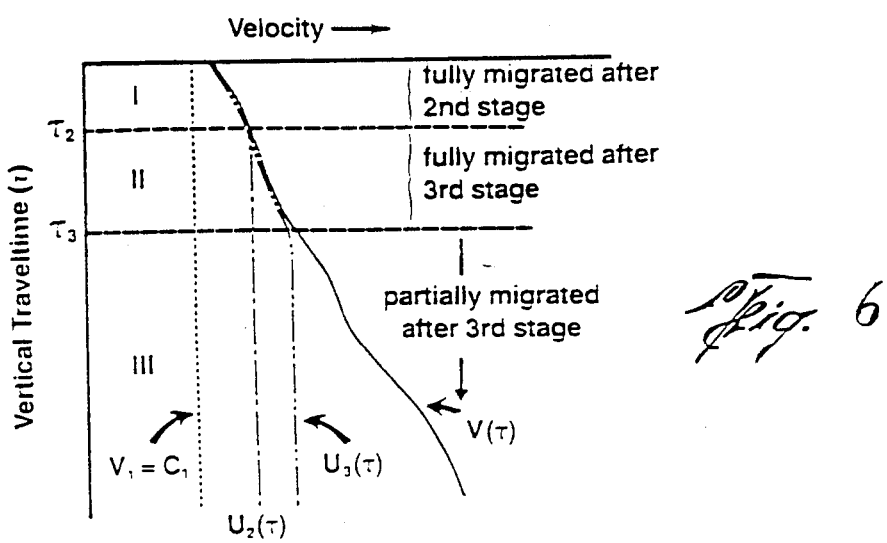

A better understanding of the physical significance of Equation (24) may be gleaned from FIGS. 4–6.

FIG. 4 shows a hypothetical medium-velocity function $V(\tau)$ and the constant velocity $V_1(\tau) = C_1 < V(\tau)$ that we might use for the first stage of a cascade migration. To obtain accurate results, the velocity function used in any of the given migration stages should not exceed some predetermined value, C. By choosing $V_1(\tau) = C_1 \leq C$, we satisfy both the requirement that $V_1$ be small and that the first stage of migration be constant. Suppose that in the second migration stage (FIG. 5), the choice $V_2(\tau) = C_2 \leq C$ is such that $C_1^2 + C_2^2 > V^2(\tau)$ for $0 \leq \tau \leq \tau_2$. Then, if we used $V_2(\tau) = C_2$, the data above $\tau_2$ would be overmigrated. Instead let us use $V_2$ such that $$V_2^2(\tau) = \begin{cases} V^2(\tau) - C_1^2 & \text{for } 0 \leq \tau \leq \tau_2 \\ C_2^2 - V^2(\tau) - C_1^2 & \text{for } \tau > \tau_2, \end{cases} \quad (25)$$

for the second-stage velocity. Now, by equation (1), after this stage, the data from the surface down to depth $\tau_2$ (Zone I in FIG. 5) will be fully migrated. This portion of the processed data is saved. For the next (third) migration stage we can, for all purposes, consider depth $\tau_2$ as the surface of the medium and, hence, start the migration at that depth. The first two migration stages have in essence accomplished the following for the data below depth $\tau = \tau_2$: (1) downward-continued the wave field to depth $\tau_2$ with the correct velocity $V(\tau)$, and (2) migrated the data beneath depth $\tau_2$ with the constant velocity $V(\tau_2) = (C_1^2 + C_2^2)^{\frac{1}{2}}$. Thus, the approach for $\tau > \tau_2$ still satisfied the requirement for accurate residual migration in the presence of depth-variable velocity.

By induction, we can proceed to the third migration stage (FIG. 6) and to subsequent ones. For the jth stage, the previous $j-1$ stages have yielded fully migrated (and saved) data from the surface down to $\tau = \tau_{j-1}$. We then migrate with velocity $V_j(\tau)$ such that $$V_j^2(\tau) = \begin{cases} V^2(\tau) - \sum_{i=1}^{j-1} C_i^2 & \text{for } \tau_{j-1} \leq \tau \leq \tau_j \\ C_j^2 = V^2(\tau_j) - \sum_{i=1}^{j-1} C_i^2 & \text{for } \tau > \tau_j, \end{cases} \quad (26)$$

for $j = 2, \ldots, n$, where the velocities $C_j$ are all constants, and $\tau_1 = 0$.

Thus, prior to any given migration stage j, the portion of the data that has not yet been fully migrated (i.e., $\tau > \tau_{j-1}$) has, so far, been correctly downward continued to $\tau = \tau_{j-1}$ and migrated beneath with a velocity function $V(\tau_{j-1})$ that is constant below $\tau_{j-1}$. This condition is all that is truly required for accurate cascaded (or residual) migration of data from vertically inhomogeneous media.

In the illustration, only the first migration stage was velocity constant from the surface downward. In general, we might be able to do k stages of migration with constant velocity $V_j(\tau)=C_j \leq C$, $j=1,2,\ldots k$, before we encounter the situation $$\sum_{j=1}^{k+1} C_j^2 > V^2(\tau).$$

In that case, the first k stages are equivalent to a single stage of migration with the constant velocity $$\left( \sum_{j=1}^{k} C_j^2 \right)^{\frac{1}{2}},$$

and the first portion of data that becomes fully migrated covers the depth range $0 \leq \tau \leq \tau_{k+1}$. In that situation, $\tau_j = 0$, for $j=1,2,\ldots k$.

Our generalization of the requirement of accurate residual migration can now be stated as follows: All migration stages with the exception of the last one for a given depth range must be done with velocity that is constant over that range and below.

It should be understood that the tau-boundaries ($\tau$) have nothing to do with physical earth layers or with the so-called $\tau$-step intervals used in the downward continuation process within each migration stage.

A $\tau$-step interval relates to the width of the mathematical "bite" used for finite-difference migration. It so happens that cascaded migration is nearly as efficient as using single-stage migration with the "correct" migration velocity because the width of a $\tau$-step interval is roughly proportional to the number of migration stages. That is, if for single-stage migration a $\tau$-step of 0.020s must be used, then for a ten-step cascaded migration process, $\tau$-steps of about 0.200s can be employed.

For illustrative purposes, my invention has been described with a certain degree of specificity. Variations will occur to those skilled in the art but which may be included within the scope and spirit of this invention which is limited only by the appended claims.

I claim as my invention:

1. A method for migrating seismic data, comprising the steps of:
    generating a depth-variable velocity function from seismic data samples of a body of seismic data arranged in an array of seismic-wave travel times as a function of spatial distribution, said depth-variable velocity function being limited by a maximum velocity observed at a greatest travel time of interest;
    calculating a minor velocity fraction from said maximum velocity, said minor velocity fraction being a function of the maximum velocity and a number of migration stages contemplated;
    partially migrating, by use of automatic data processing means, the data samples of said body of seismic data during each one of a succession of a plurality of migration stages, during each stage, applying said minor velocity fraction as a constant;
    defining a jth-order effective migration velocity from a succession of j-migration stages;
    applying said depth-variable velocity function as a migration velocity for all data samples that were not fully migrated during a (j−1)th migration stage, wherein the jth-order effective migration velocity is greater than the depth-variable velocity function; and
    displaying the fully migrated data samples.

2. The method as defined by claim 1, wherein the jth-order effective migration velocity $U_j$ is defined by $$U_j = \left( \sum_{1}^{j} V_{max}^2/n \right)^{\frac{1}{2}},$$

where n is the number of migration stages contemplated.

3. A method for migrating seismic data, comprising the steps of:
    generating a depth-variable velocity function from samples of seismic data, said depth-variable velocity function being limited by a maximum velocity observed at a greatest travel time of interest;
    selecting a number of migration stages;
    calculating a velocity fraction from said maximum velocity, said velocity fraction being a function of said maximum velocity and said number of migration stages contemplated;
    migrating, by use of a general purpose computer, the samples of seismic data during each one of a succession of said migration stages, during each stage, applying said velocity fraction as a migration velocity;
    defining a jth-order effective migration velocity from a succession of j-migration stages;
    migrating, by use of said general purpose computer, all samples of seismic data not fully migrated during a (j−1)th migration stage, by said depth-variable velocity function, wherein a jth-order effective migration velocity is greater than said depth-variable velocity function; and
    displaying the fully migrated data samples in a seismic section.

4. The method as defined in claim 3, wherein the jth-order effective migration velocity is defined by $$U_j = \left( \sum_{1}^{j} V_{max}^2/n \right)^{\frac{1}{2}},$$

where
    $U_j$ is the jth-order effective migration velocity,
    $V_{max}$ is the maximum velocity, and
    n is the number of migration stages contemplated.

5. A computer-aid method for migrating seismic data, comprising the steps of:
    calculating a depth-variable velocity function from samples of seismic data, the depth-variable velocity function having a maximum velocity observed at a greatest travel time of interest;
    establishing a number of migration stages in which to migrate the seismic data;
    determining a minor velocity from said maximum velocity, said minor velocity being a function of the maximum velocity and said number of migration stages established;
    defining an effective migration velocity for each of said number of migration stages, each successive effective migration velocity being greater than said minor velocity and less than or equal to said maximum velocity;

migrating the samples of seismic data during each one of a succession of the migration stages, during each stage, applying said effective migration velocity to samples of seismic data not fully migrated and applying said depth-variable velocity function to samples of seismic data that would be overmigrated by said effective migration velocity.

* * * * *